Patented Apr. 28, 1953

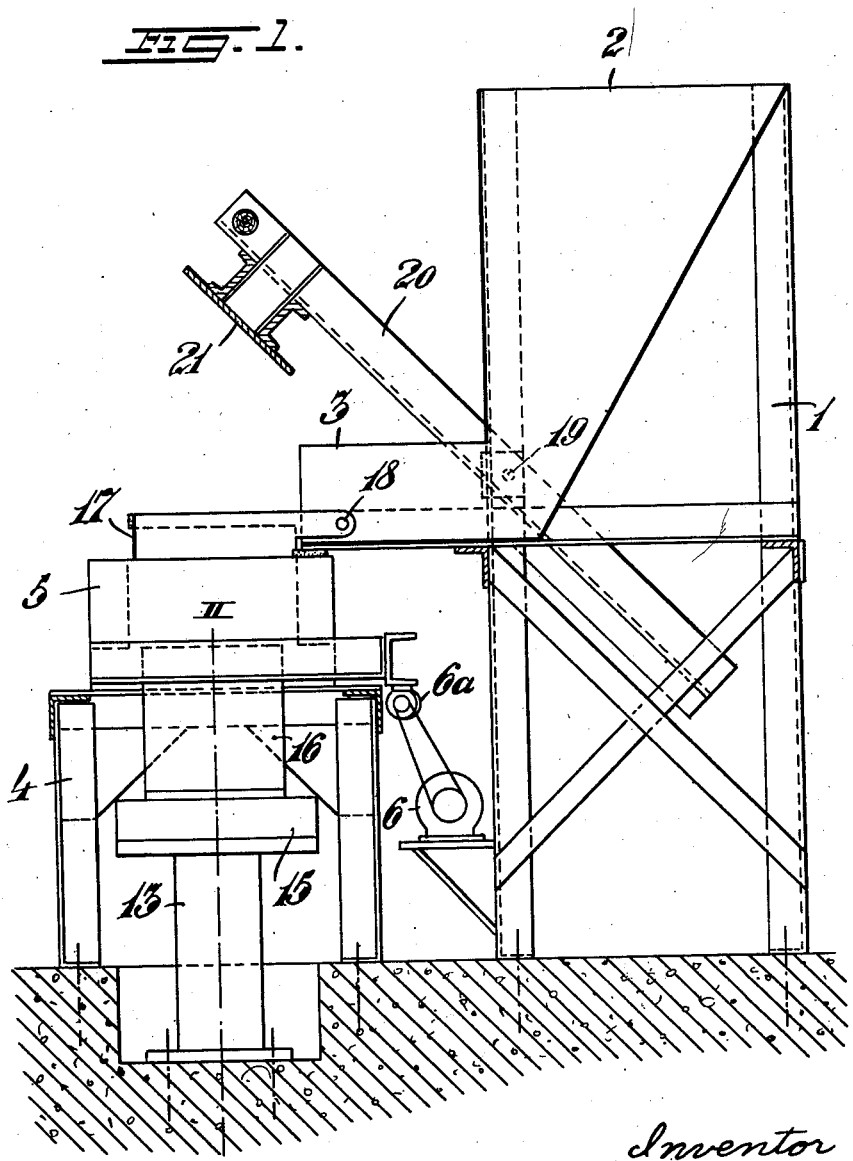

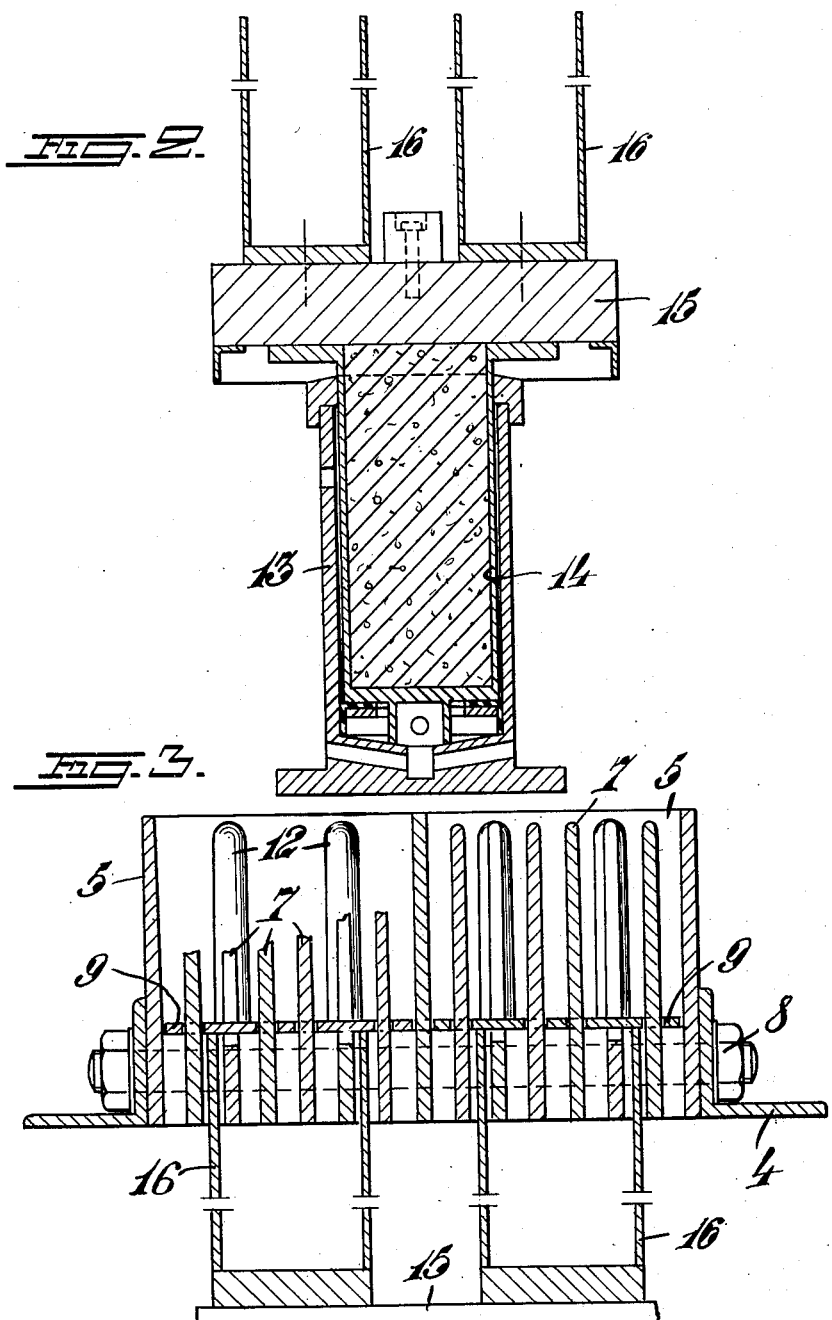

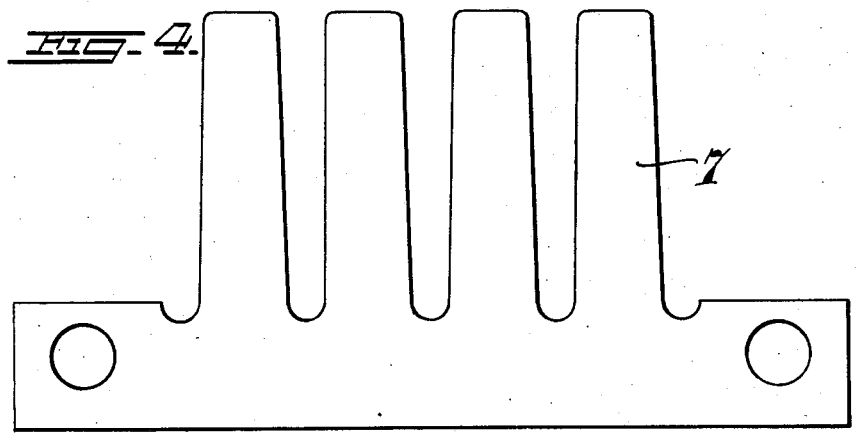
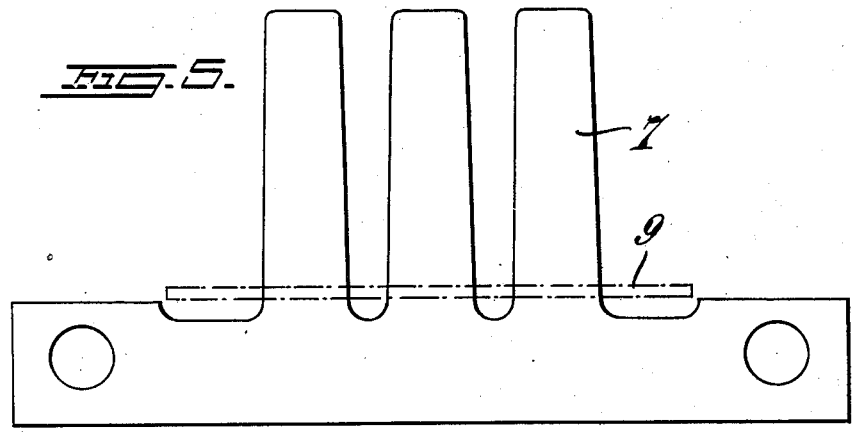
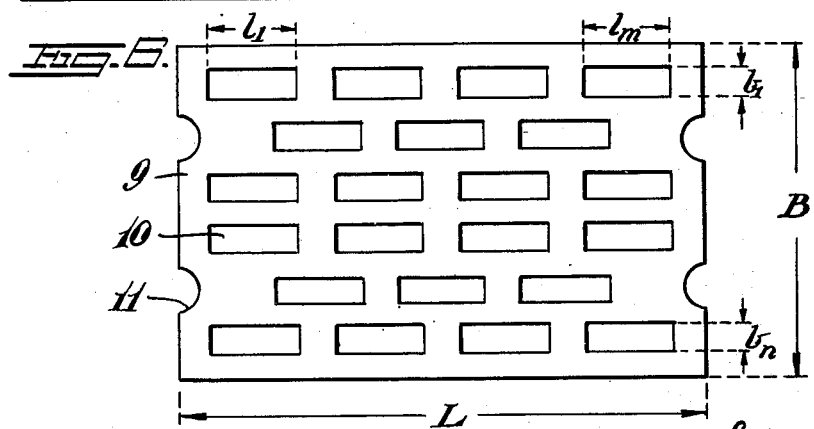

2,636,242

UNITED STATES PATENT OFFICE 2,636,242

MACHINE FOR MOLDING HOLLOW CONCRETE BLOCKS

Emrik Ivar Lindman, Ekbacken, Ronninge, Sweden

Application July 29, 1947, Serial No. 764,482
In Sweden April 28, 1939

Section 1, Public Law 690, August 8, 1946
Patent expires April 28, 1959

5 Claims. (Cl. 25—41)

This invention relates to machines for producing molded bodies of artificial stone.

Machines for making building blocks with channels are known, but they only make blocks with a few big channels. It is however desirable to have a great number of such channels and the channels should be small. In such case, the machines heretofore known entirely fail, because it is quire impossible to stamp or to shake the concrete to cause it to enter the mould and to fill it completely. Reference is made to the fact that the concrete or other mass used for the blocks must have a semi-dry or plastic consistency so that it does not flow, but will maintain its shape, after the mould has been removed.

The machine in accordance with this invention renders it possible to manufacture such hollow moulded bodies of artificial stone. Thus, my invention is for a machine for producing hollow moulded bodies of artificial stone comprising a stationary mould box open at its top, teeth projecting from below into said mould for forming holes in the moulded bodies and a loose bottom adapted to be raised and apertured for receiving the teeth and pushed thereover, characterised in this that the teeth and the side walls are rigidly interconnected to form a stiff unit which is connected with a high frequency vibrator, comprising, for instance, an unbalanced rotary member whereby the unit of mould side walls and teeth is caused to vibrate with resilient vibrations in the material proper.

In the design of concrete bodies hitherto practised the features determining the heat insulation of a block provided with cavities have not been duly considered. Thus, the bodies have been shaped at random whereby bad results have been obtained.

Thus I have found that in order to secure an optimum heat insulation consistent with the necessary strength of the block the latter is to be constructed with $n$ holes (rows of holes) across the width B (measured in centimetres), B and $n$ being related as follows:

$$B \leqq 4.5n$$

and in addition the length $l$ and width $b$ of the holes should be related as follows $$\frac{l}{b} \geqq 1.5$$

Moreover, I have found that considering the laying of the blocks into the desired structure the height H of the blocks and the height $h$ of the holes (which are open at the upper ends) should be related as follows $$H > h \geqq 0.9H$$

whereby a perfect heat insulation is simultaneously obtained.

Thus, the number of rows of holes as seen in the direction of the width of the block should be 4, 5, 6 or more according to the thickness of the block. When determining the maximum number one has inter alia to consider that the strength of the block will be sufficiently high, as many holes as is consistent with said strength being used. The heat transmission through the wall or the like in which the block is to be used as a brick is assumed to take place in the direction of the width of the block. Thus the width of the blocks equals the thickness of the wall.

By my machine moulded bodies are obtained possessing materially improved characteristics over prior bodies of this type well known in the art. Above all the ratio of (strength+heat insulation) to costs will be high. In other words, the costs for obtaining a predetermined heat insulation while maintaining a sufficient strength will be low. Simultaneously the shape of the block can be so accommodated to the properties of the raw material that no difficulties of manufacture arise. Thus by applying the present invention cheap hollow blocks can be manufactured from concrete clinker grains (crushed burnt clay) obtained, for instance, according to the process of British patent specification 256,580 and cement as raw materials and with a thickness (width) of 25 cm. effecting a heat insulation corresponding to brick masonry having a thickness of 100 cm. although the costs of the hollow wall are lower than those of an ordinary brick wall having a thickness of 25 cm. Even of ordinary sand and cement very cheap hollow blocks can be manufactured according to the invention which already at a thickness of 25 cm. effect the same heat insulation as a brick wall having a thickness of 40 cm.

The use of ordinary sand and cement as raw materials is of great importance for places far out of the way in which raw materials of improved quality (such as crushed lava or crushed concrete clinker) cannot be used due to the costs of transport. Considering the strength of the wall and the necessity of securing satisfactory bearings for beams as used the walls—even in small houses—should not have a thickness below 20 cm. With this thickness a heat insulation is obtained according to the invention at low costs corresponding to a considerably thicker (for instance, several times thicker) brick wall. Thus, the invention permits a considerable decrease of the building costs.

An embodiment of a machine according to the invention is illustrated in the annexed drawings.

Fig. 1 is a vertical section of the machine.

Fig. 2 is, on an enlarged scale, a vertical section of a plunger for ejecting the moulded blocks and a part of the moulding box along line II—II in Fig. 1.

Fig. 3 is a cross section of the moulding box and certain adjacent parts.

Figs. 4 and 5 are views in elevation of teeth or comb members producing the holes in the blocks.

Fig. 6 is a top plan view of a bottom plate threaded over the teeth. (It is to be noted that the finished block in top plan view obtains the appearance shown in Fig. 6.)

Figs. 3–6 are drawn on the same scale which is enlarged over that used in Fig. 2.

In the drawing 1 represents a stationary framework to which a hopper 2 for the mass of which the moulded blocks are to be made is secured. The mass which should be relatively dry and present a consistency similar to that of moist earth so as to maintain its form comprises cement, water and sand either ordinary sand or preferably crushed lava, crushed concrete clinker (clay expanded during burning) or like porous matter effecting a heat insulation better than that obtainable by the use of ordinary sand in the mass. Crushed lava or concrete clinker are in addition very hard and impart, therefore, a high strength to the moulded bodies. Instead of cement other hydraulic binding materials or binding materials adapted for hydrothermal treatment (such as hardening by steam) can be used.

At its bottom end the hopper 2 opens into a channel 3 through which the material is fed into the mould.

Secured to a stationary base 4 is a mould box 5. A stationary electric motor 6 drives by means of a belt transmission an unbalanced (eccentric) rotary member 6a (vibrator) which is connected to the mould box 5 and causes it to vibrate resiliently. No shaking movements of large amplitude are imparted to the mould box but merely rapid vibrations of small amplitude causing the matter contained in the box to vibrate. It has been found that different moulded bodies require different frequencies of vibration and for obtaining good results the frequency of vibration should be at least 1000 oscillations per minute. Most frequently considerably higher frequencies are to be preferred, such as, for instance, 5000–7000 oscillations per minute.

A resilient lining, for instance, of rubber is preferably inserted between the mould box 5 and the base to prevent transmission of the vibrations to the base 4. The belt transmission between the motor 6 and the vibrator 6a prevents transmission of the vibrations to the motor 6 and the framework 1. Thus, the vibrations are substantially restricted to the vibrator 6a and the mould box 5 whereby the power consumption for the vibration becomes low and in addition those portions which need not be vibrated are protected against unnecessary strains.

In the embodiment shown the mould box is adapted for making two moulded blocks at a time and is open at its top and bottom. For producing the holes in the moulded bodies teeth 7 are used projecting from plates of high-class steel secured inside the mould box by means of bolts 8 to form a unit therewith. Loose bottom plates 9 are passed over these teeth one for each of the two blocks simultaneously formed in the mould. The bottom plates 9 are provided with apertures 10 for receiving the teeth 7 as well as with recesses 11 for receiving ribs 12 projecting from the end walls of the mould box 5.

Mounted inside the base 4 is a stationary cylinder 13 in which a plunger 14 is movable and adapted to be raised hydraulically or pneumatically in well known manner. For obtaining a greater mass and thereby a steady movement the plunger is filled with concrete or the like. The plunger 14 carries a plate 15, for instance, of cast iron to which four lifting plates 16 are secured. These plates are so placed that they in the upward movement of the plunger 14 move between the rows of teeth 7.

Secured to the upper edge of the mould box 5 is a guiding frame 17 for the material supplied from the channel 3, said frame being pivoted to the channel 3 by means of pins 18 so that the frame can easily be swung away when the finished moulded bodies are to be removed from the mould. A lever 20 is mounted to rock on the framework 1 by means of a shaft 19 and carries a plate 21.

The operation of the device above described is as follows:

Figs. 1–3 show the mould in a position ready for receiving the material. The plunger 14 is in its lower position, the lever 20 is swung away, the guiding frame 17 is swung down on to the upper face of the mould box and two loose bottom plates 9 are inserted in the mould box. Now the operator supplies a sufficient quantity of material from the hopper 2 through the channel 3 to fill the mould well, the frame 17 preventing the material from escaping laterally of the mould. During this operation the motor 6 rotates so that the vibrator 6a sets the mould box 5, the comb members 7 and the bottom plates 9 in rapid vibration. I have found that the vibrations render the material otherwise inert and merely movable with difficulty so "live" and easily movable that it floats and easily fills up all parts of the mould box although the material has a consistency similar to that of moist earth and, therefore, if not subjected to vibration maintains its shape without floating. If on the other hand the motor is stopped or runs at a too low speed then it will prove impossible in practice to secure that the material completely fills up all parts of the mould. Even if the mould (without vibration) is subjected to powerful shaking movements of large amplitude the material is jammed between the teeth and does not penetrate to the bottom of the mould.

After the mould box thus has been well filled the frame 17 is swung away and by means of the lever 20 the plate 21 is swung down into engagement with the upper face of the mould box to flatten the moulded body at its top face. The vibrator 6a is now stopped, the plate 21 is again raised and a driving medium is supplied to the cylinder 13 so that the plunger 14 is raised. The plates 16 then raise the bottom plates 19 and the moulded bodies situated thereon above the top edge of the mould box 5 and these plates together with the moulded bodies standing thereon are then removed from the machine. As above pointed out the material of the moulded bodies has a consistency similar to that of moist earth and maintains, therefore, its form after the vibration has ceased. The moulded bodies are now permitted to harden and can then remain in their standing position on the bottom plates 9. If the binding material is adapted to be treated hydrothermally the moulded bodies are subjected to a steam hardening.

After the driving medium has been cut off the plunger 14 under the influence of its weight returns to its lower position. Fresh plates 9 are then inserted in the mould box 5, the frame 17 is swung down and the vibrator 6a re-started whereupon the process can be repeated. One or a plurality or all of the individual operations of the moulding process can, of course, be effected automatically. It is to be noted, however, that even if the operations involved are effected manually the machine, although of simple design yet has a very high output.

Having now particularly described and ascertained the nature of my said invention and in what manner the same is to be performed, I declare that what I claim is:

1. In a machine for producing from concrete hollow moulded blocks for building purposes having a stationary mould box open upwards, in combination, combs with rigid teeeth projecting vertically from below into said mould for shaping holes in the moulded block, a loose vertically movable bottom apertured for receiving said teeth and pushed over them from above, said mould box having side walls rigidly interconnected with said combs to form a stiff unit, and a vibrator of at least 1000 vibrations per minute rigidly connected with said side walls and said combs to vibrate them with resilient vibrations in the very material thereof.

2. In a machine for producing hollow moulded concrete blocks for building purposes and having a stationary mould box open upwards, in combination, combs with rigid teeth projecting vertically from below into said mould for shaping holes in the moulded block, a loose vertically movable bottom apertured for receiving said teeth and pushed over them from above, said mould box having side walls, bolts extending through said side walls and said combs to unite them to a rigid unit, bearings rigidly secured to said unit of side walls and combs, an eccentric rotatably journalled in said bearings, a frame for said mould, resilient lining inserted between said frame and said rigid unit of side walls and combs, a driving motor on said frame, and a resilient transmission between said motor and said eccentric.

3. In a machine for producing from concrete hollow moulded blocks for builing purposes having a stationary mould box open upwards, in combination, combs with rigid teeth projecting vertically from below into said mould for shaping holes in the moulded block, a loose vertically movable bottom apertured for receiving said teeth and pushed over them from above, said mould box having side walls rigidly interconnected with said combs to form a stiff unit, and a vibrator of at least 1000 vibrations per minute rigidly connected with said side walls and said combs to vibrate them with resilient vibrations in the very material thereof, the interior width B of the mould box in centimeters and the number $n$ of teeth across the width B being related as follows $$B \leq 4.5n$$

4. In a machine for producing from concrete hollow moulded blocks for building purposes having a stationary mould box open upwards, in combination, combs with rigid teeth projecting vertically from below into said mould for shaping holes in the moulded block, a loose vertically movable bottom apertured for receiving said teeth and pushed over them from above, side walls in said mould rigidly interconnected with said combs to form a stiff unit, and a vibrator of at least 1000 vibrations per minute rigidly connected with said side walls and said combs to vibrate them with resilient vibrations in the very material thereof, the interior width B of the mould box in centimeters and the number $n$ of teeth across the width B being related as follows $$B \leq 4.5n$$

while the length $l$ and the width $b$ of the cross section of each tooth are related as follows $$\frac{l}{b} \geq 1.5$$

5. In a machine for producing from concrete hollow moulded blocks for building purposes having a stationary mould box open upwards, in combination, combs with rigid teeth projecting vertically from below into said mould for shaping holes in the moulded block, a loose vertically movable bottom apertured for receiving said teeth and pushed over them from above, side walls in said mould rigidly interconnected with said combs to form a stiff unit, and a vibrator of at least 1000 vibrations per minute rigidly connected with said side walls and said combs to vibrate them with resilient vibrations in the very material thereof, the interior width B of the mould box in centimeters and the number $n$ of teeth across the width B being related as follows $$B \leq 4.5n$$

while the length $l$ and the width $b$ of the cross section of each tooth are related as follows $$\frac{l}{b} \geq 1.5$$

while simultaneously the height H of the mould box and the height $h$ of the teeth both measured from the upper surface of the loose bottom are related as follows:

$$H > h \geq 0.9H$$

EMRIK IVAR LINDMAN.

References Cited in the file of this patent

UNITED STATES PATENTS

| Number | Name | Date |
| --- | --- | --- |
| 759,010 | Palmer | May 3, 1904 |
| 1,582,735 | Cooper | Apr. 27, 1926 |
| 1,669,682 | Straub | May 15, 1928 |
| 1,787,449 | Jackson | Jan. 6, 1931 |
| 1,979,548 | Horsch | Nov. 6, 1934 |
| 2,054,253 | Horsch | Sept. 15, 1936 |
| 2,303,884 | Krehbiel et al. | Dec. 1, 1942 |
| 2,308,132 | Wellnitz | Jan. 12, 1943 |
| 2,400,631 | Darden | May 21, 1946 |